United States Patent [19]

Menshen

[11] 3,982,304

[45] Sept. 28, 1976

[54] PLASTIC CLAMPING APPARATUS

[76] Inventor: Arnold Menshen, Beuler-Weg 52, Neuenrade Westphalia, Germany

[22] Filed: Dec. 11, 1974

[21] Appl. No.: 531,470

[52] U.S. Cl. .......................... 24/73 AP; 248/68 CB
[51] Int. Cl.² .................. F16L 3/22; A44B 21/00
[58] Field of Search ...... 24/73 AP, 248 SL, 249 SL, 24/255 SL, 81 BA, 81 CC; 248/68 CB, 71, 74 A, 74 B

[56] References Cited
UNITED STATES PATENTS

| | | | |
|---|---|---|---|
| 1,164,613 | 12/1915 | Jewell | 24/81 CC |
| 1,474,736 | 11/1923 | Schaub | 248/71 |
| 2,339,093 | 1/1944 | Metheny | 248/74 B |
| 3,188,138 | 6/1965 | Lockshin | 24/81 CC |
| 3,199,816 | 8/1965 | Weisz | 248/71 |
| 3,682,422 | 8/1972 | Evans | 248/68 CB |
| 3,739,525 | 6/1973 | Rybak | 24/248 SL |

FOREIGN PATENTS OR APPLICATIONS

| | | | |
|---|---|---|---|
| 1,144,348 | 3/1969 | United Kingdom | 248/74 A |
| 893,448 | 4/1962 | United Kingdom | 248/74 A |
| 1,147,914 | 4/1969 | United Kingdom | 24/73 AP |

*Primary Examiner*—Donald A. Griffin
*Attorney, Agent, or Firm*—Carella, Bain, Gilfillan & Rhodes

[57] ABSTRACT

Integrally molded plastic clamping apparatus including a body portion having a plurality of recesses formed therein for receiving longitudinally extending members and including a mounting member and a hinge portion formed between the body portion and the mounting member and wherein the plastic of which said body portion, hinge and mounting member are integrally formed is sufficiently flexible to permit said body portion to pivot away from said mounting member by said hinge portion to permit said recesses to receive said longitudinally extending members and to permit said body portion to pivot toward and in engagement with said mounting members whereby upon a fastener extending through a bore formed in the body portion and an aperture formed in the mounting member and placed in engagement with a support surface the longitudinally extending members are clamped in said recesses and secured to the support surface; the clamping apparatus may also include a plastic tab formed integrally on the mounting member and being engageable with the body portion to maintain the body portion and mounting member together during mounting of the clamping apparatus and upon the clamping apparatus being mounted the tab provides a surface for engaging the outer free end wall of the body portion thereby preventing outward expansion of the free end wall and thereby maintaining the longitudinally extending members within the recesses.

1 Claim, 3 Drawing Figures

PLASTIC CLAMPING APPARATUS

BACKGROUND OF THE INVENTION

This invention relates to clamping apparatus in general and in particular to plastic clamping apparatus for securing longitudinally extending members such as various tubular members and electrically insulated wires to a support surface such as a wall.

In the prior art, such clamping apparatus are typically comprised of two physically distinct pieces such as a first piece having a plurality of recesses formed therein and a separate piece, physically distinct from the first piece, which is typically a mounting plate which forms in combination with the first piece the clamping apparatus. As known to those skilled in the art, problems arise in maintaining corresponding quantities of first and second pieces whereby unwanted waste can be experienced due to failure to have the same number of first and second pieces. Also, and as further known to those skilled in the art, some difficulty is experienced by an operator in mounting clamping apparatus comprised of two separate pieces.

SUMMARY

The present invention overcomes the above-noted prior art difficulties and disadvantages of known clamping apparatus by providing clamping apparatus wherein the first piece or body portion having a plurality of recesses formed therein is flexibly hinged to a second piece or support member thereby assuring an always present, equal number of first and second pieces due to their physical integrity and further providing improved ease of installation since the two members are physically interconnected. Also a tab may be included for maintaining the clamping apparatus closed during mounting and for preventing expansion of the clamping apparatus after mounting.

DESCRIPTION OF THE INVENTION

Figure 1:
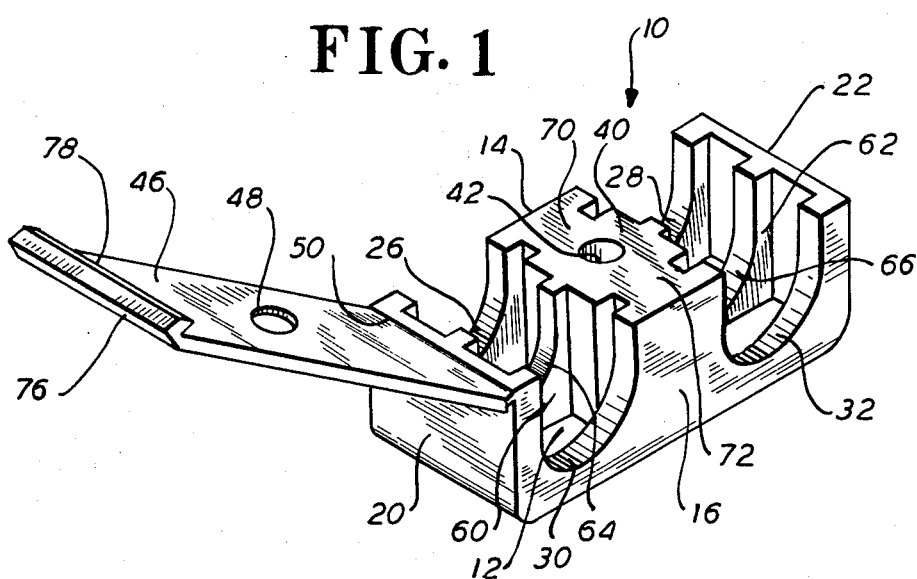
FIG. 1 is a perspective view of clamping apparatus embodying the present invention.

Referring to FIG. 1, there is shown plastic clamping apparatus embodying the present invention the component parts of which may be suitably molded integrally, such as by injection molding, from a suitably flexible plastic material such as for example, polypropylene.

The plastic clamping apparatus comprises a plastic body indicated by general numerical designation 10 which plastic body may include a base portion 12, a pair of side walls 14 and 16 extending from the side edges of the base portion and formed integrally therewith such as by injection molding. The plastic body 10 may further include a pair of end walls 20 and 22 extending from the end edges of the base portion and extending between the ends of the side walls 14 and 16 and being formed integrally with the base portion and said walls such as by injection molding.

A plurality of recesses 26 and 28 are formed in side wall 14 and a plurality of recesses 30 and 32 are formed in side wall 16 with the recesses 26 and 28 being coaxially aligned with the recesses 30 and 32, respectively. As may be better seen in FIG. 2, the recesses 30 and 32 are for receiving longitudinally extending members, such as tubular members or insulated electrical wires, represented by numerical designations 34 and 36.

Referring again to FIG. 1, the plastic body 10 may further include an integrally formed, such as by injection molding, fastener guide post 40 which extends perpendicularly from the base portion 12 and is enclosed by the side walls 14 and 16 and the end walls 20 and 22. The fastener guide post 40 is disposed between coaxially aligned recesses 26–30 and 28–32 and has a fastener receiving bore 42 formed therethrough and extending perpendicularly with respect to the base portion 12.

The plastic clamping apparatus may further include a plastic mounting member 46 having a fastener receiving aperture 48 formed therein.

Figure 2:
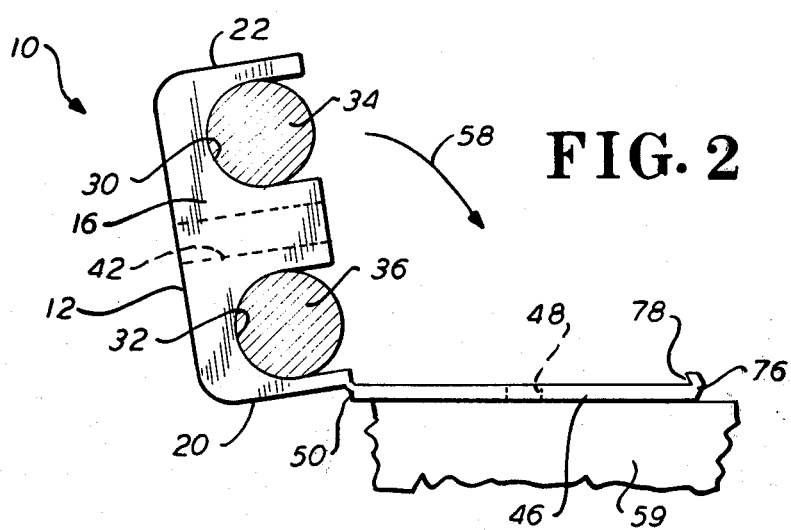
FIG. 2 is a side view of such clamping apparatus showing the body portion pivoted away from the support member by the flexible hinge portion.

The clamping apparatus of the present invention may further include a plastic hinge portion 50 formed between and integrally with an end edge of the mounting member and the outer free edge of end wall 20 as may be best seen in FIG. 2. Such hinge portion 50 may be so integrally formed with the body portion 10 and the mounting member 46 by being injection molded integrally therewith.

Figure 3:
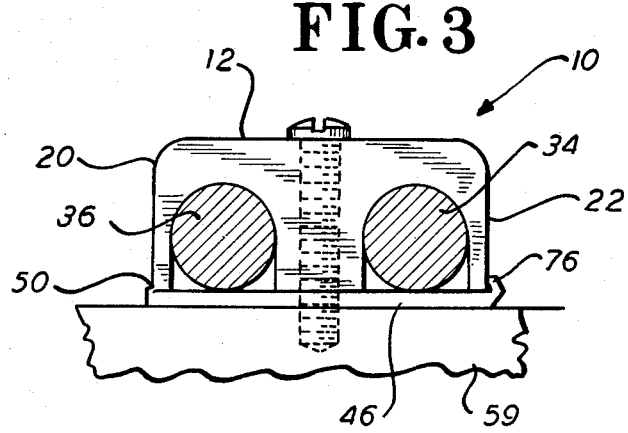
FIG. 3 is a side view of such clamping apparatus showing the body portion pivoted toward and in engagement with the support member by the flexible hinge.

The present invention is made of plastic, such as for example the above-noted polypropylene, which is sufficiently flexible to permit the body 10, as shown in FIG. 2, to pivot away from the mounting member 46 by the flexible hinge 50 to permit the coaxially aligned recesses 26–30 and 28–32 to receive longitudinally extending members 34 and 36, and such plastic is also sufficiently flexible to permit the body 10 to pivot toward the mounting member 46 by flexible hinge 50, as indicated by arrow 58 in FIG. 2, to permit the outer free ends of the side walls 12 and 16 and end walls 20 and 22 to engage the mounting member 46, as shown in FIG. 3, and to permit the bore 42 of the fastener guide post 40 to be coaxially aligned with the aperture 48 formed in the mounting member 46.

As shown in FIG. 3, upon a suitable fastener, such as a threaded screw or bolt, being inserted through the coaxially aligned bore 42 and aperture 48 and engaging a representative support surface, such as the partially shown wall 58, the longitudinally extending members 34 and 36 are securely clamped between the recesses 26–30 and 28–32 and the mounting member 46 and are secured to the support surface 58.

Referring again to FIG. 1, the clamping apparatus of the present invention may further include a pair of longitudinally aligned ribs 60 and 62 extending parallel to the side walls 14 and 16 with each of the longitudinally aligned ribs 60 and 62 extending from the inner surface of the base portion 12 with their respective ends joined to the inner surfaces of the end walls 20 and 22 and a vertical side of the fastener guide post 40. Each of the longitudinally aligned ribs is formed integrally with the base portion, respective end wall and fastener guide post by being, for example, injection molded integrally therewith. As may be further seen in FIG. 1, the longitudinally aligned ribs 60 and 62 have recesses 64 and 66 formed therein, respectively, with the recess 64 being coaxially aligned with recesses 26 and 30 and with the recess 66 being coaxially aligned with recesses 28 and 32.

Referring still to FIG. 1, the clamping apparatus of the present invention may further include a pair of transverse ribs 70 and 72 longitudinally aligned and extending parallel to the end walls 20 and 22. Transverse rib 70 extends from the inner surface of side wall 14 to a vertical surface of the fastener guide post 40 and the transverse rib 72 extends from the inner surface of side wall 16 to a vertical surface of the fastener guide post 40; the transverse ribs being formed integrally with the respective side walls and with the fastener guide posts by, for example, being injection molded integrally therewith.

Referring again to FIGS. 1–3, it will be noted that the free end edge of the mounting member 46 may be provided with an integrally formed plastic tab 76 having a surface 78 extending upwardly and being inclined slightly toward the mounting member 46 such that the top of the tab 76 slightly interferes with the pivoting of the end wall 22 into engagement with the mounting member 46 as shown in FIG. 3. Thus, the tab 76, upon the body 10 being pivoted into engagement with the mounting member 46, lightly retains the body 10 in engagement with the mounting member 46 thereby assisting in maintaining the body 10 and mounting member 46 closed during mounting of the plastic clamping apparatus, and upon the clamping apparatus being mounted to a support surface such as wall 59, the surface 78 of the tab 76 engages the end wall 22 and prevents the end wall 22 from expanding outwardly whereby the longitudinally extending members 34 and 36 are maintained closely within the recesses 26–30 and 28–32.

It will be understood by those skilled in the art that the present description is merely illustrative of the present invention and that many modifications and variations may be made therein without departing from the spirit and the scope thereof.

What is claimed is:

1. Integrally molded plastic clamping apparatus for securely clamping longitudinally extending members on a support surface, comprising:
   1. a plastic body including:
      a. a base portion,
      b. a pair of side walls extending from the side edges of said base portion and formed integrally therewith,
      c. a pair of end walls extending from the end edges of said base portion and extending between the ends of said side walls and formed integrally with said base portion and said side walls,
      d. each of said side walls having a plurality of recesses formed therein extending from the outer free edge of the respective side wall towards said base portion, said recesses for receiving said longitudinally extending members and the recesses in each side wall being in coaxial alignment with the recesses in the other side wall,
      e. a fastener guide post formed integrally with and extending perpendicularly from said base portion and being enclosed by said side wall and end walls, said fastener guide post disposed between said coaxially aligned recesses and having a fastener receiving bore formed therethrough and extending perpendicularly with respect to said base portion;
   2. a flat plastic mounting member having a fastener receiving aperture formed therein;
   3. a plastic hinge portion formed between and integrally with an end edge of said mounting member and the outer free edge of one of said end walls;
   4. said plastic being sufficiently flexible to permit said body to pivot through more than 90° away from said mounting member by said hinge portion to permit said coaxially aligned recesses to receive said longitudinally extending members and to permit said body to pivot toward said mounting member and permit the outer free ends of said side and end walls to engage said mounting member and to permit said bore and said aperture to be coaxially aligned, whereby upon a fastener extending through said coaxially aligned bore and said aperture and engaging said support surface, said longitudinally extending members are securely clamped in said recesses between said side walls and said supporting member and are secured to said support surface;
   5. a plastic tab formed integrally with said mounting member and at the outer free end edge thereof, said tab providing a surface extending upwardly from said mounting member and being inclined slightly toward said mounting member whereby upon said plastic body being pivoted towards said mounting member, said tab slightly interferes with the outer free end wall of said plastic body thereby maintaining said plastic body and said mounting member closed during mounting of said clamping apparatus upon said support surface, and upon said clamping apparatus being mounted on said support surface said inclined surface for engaging said outer free end wall of said body thereby preventing outward expansion of said free end wall and thereby maintaining said longitudinally extending members within said recesses.

* * * * *